(12) United States Patent
Couture et al.

(10) Patent No.: US 7,891,446 B2
(45) Date of Patent: Feb. 22, 2011

(54) ROBOTIC VEHICLE DECK ADJUSTMENT

(75) Inventors: Adam P. Couture, Allston, MA (US);
Richard Page, Middleton, MA (US);
John P. O'Brien, Newton, MA (US)

(73) Assignee: iRobot Corporation, Bedford, MA (US)

( * ) Notice: Subject to any disclaimer, the term of this patent is extended or adjusted under 35 U.S.C. 154(b) by 167 days.

(21) Appl. No.: 11/762,315

(22) Filed: Jun. 13, 2007

(65) Prior Publication Data

US 2008/0093131 A1 Apr. 24, 2008

Related U.S. Application Data

(60) Provisional application No. 60/828,606, filed on Oct. 6, 2006.

(51) Int. Cl.
*B62D 55/065* (2006.01)
*B62D 55/075* (2006.01)

(52) U.S. Cl. ...................... 180/9.32; 180/8.7
(58) Field of Classification Search .............. 180/7.1, 180/8.7, 9.32, 9.5, 8.2; 901/48, 1
See application file for complete search history.

(56) References Cited

U.S. PATENT DOCUMENTS

| | | | |
|---|---|---|---|
| 1,069,761 A | 8/1913 | Buckley | |
| 2,917,120 A | 12/1959 | Gates et al. | |
| 3,092,200 A | 6/1963 | Chambers | |
| 3,166,138 A | 1/1965 | Dunn, Jr. | |
| 3,288,234 A * | 11/1966 | Feliz | 180/6.5 |
| 3,311,424 A | 3/1967 | Taylor | |
| 3,489,236 A | 1/1970 | Goodwin | |
| 3,869,011 A * | 3/1975 | Jensen | 180/9.23 |
| 4,009,761 A | 3/1977 | Meyer | |
| 4,027,889 A | 6/1977 | Krofchalk et al. | |
| 4,247,125 A | 1/1981 | Rayment | |
| 4,477,998 A | 10/1984 | You | |

(Continued)

FOREIGN PATENT DOCUMENTS

JP  60176871  9/1985

(Continued)

OTHER PUBLICATIONS

PackBot "iRobot PackBot Explorer" Brochure.

(Continued)

*Primary Examiner*—Lesley Morris
*Assistant Examiner*—Wesley Potter
(74) *Attorney, Agent, or Firm*—Fish & Richardson P.C.

(57) ABSTRACT

A robotic vehicle is disclosed, which is characterized by high mobility, adaptability, and the capability of being remotely controlled in hazardous environments. The robotic vehicle includes a chassis having front and rear ends and supported on right and left driven tracks. Right and left elongated flippers are disposed on corresponding sides of the chassis and operable to pivot. A linkage connects a payload deck, configured to support a removable functional payload, to the chassis. The linkage has a first end rotatably connected to the chassis at a first pivot, and a second end rotatably connected to the deck at a second pivot. Both of the first and second pivots include independently controllable pivot drivers operable to rotatably position their corresponding pivots to control both fore-aft position and pitch orientation of the payload deck with respect to the chassis.

21 Claims, 15 Drawing Sheets

U.S. PATENT DOCUMENTS

| | | | |
|---|---|---|---|
| 4,483,407 A | | 11/1984 | Iwamoto et al. |
| 4,492,058 A | | 1/1985 | Goldfarb et al. |
| 4,566,550 A | | 1/1986 | Misawa |
| 4,566,551 A | | 1/1986 | Feliz |
| 4,566,707 A | * | 1/1986 | Nitzberg ............... 180/8.2 |
| 4,570,954 A | | 2/1986 | Mintz |
| 4,645,222 A | | 2/1987 | Hester |
| 4,674,585 A | | 6/1987 | Barlow et al. |
| 4,687,068 A | | 8/1987 | Pagett |
| 4,688,813 A | | 8/1987 | Misawa et al. |
| 4,702,331 A | | 10/1987 | Hagihara et al. |
| 4,709,773 A | | 12/1987 | Clement et al. |
| 4,730,684 A | | 3/1988 | Pedersen |
| 4,813,906 A | | 3/1989 | Matsuyama et al. |
| 4,898,256 A | | 2/1990 | Lehner |
| 4,919,489 A | | 4/1990 | Kopsco |
| 4,932,491 A | | 6/1990 | Collins, Jr. |
| 4,932,831 A | | 6/1990 | White et al. |
| 4,977,971 A | | 12/1990 | Crane, III et al. |
| 4,993,912 A | | 2/1991 | King et al. |
| 5,022,812 A | | 6/1991 | Coughlan et al. |
| 5,174,405 A | | 12/1992 | Carra et al. |
| 5,197,558 A | | 3/1993 | Misawa |
| 5,248,008 A | | 9/1993 | Clar |
| 5,308,098 A | | 5/1994 | Shea |
| 5,337,846 A | | 8/1994 | Ogaki et al. |
| 5,413,367 A | | 5/1995 | Ochiai |
| 5,443,354 A | * | 8/1995 | Stone et al. ............ 414/729 |
| 5,507,358 A | | 4/1996 | Abe et al. |
| 5,515,934 A | | 5/1996 | Davis |
| 5,579,857 A | | 12/1996 | Abe et al. |
| 5,641,030 A | * | 6/1997 | Toselli ................ 180/9.32 |
| 5,833,248 A | | 11/1998 | Eguchi |
| 5,868,403 A | | 2/1999 | Culp et al. |
| 5,884,718 A | | 3/1999 | Yamashiro et al. |
| 5,890,553 A | | 4/1999 | Bar-Cohen et al. |
| 5,921,843 A | | 7/1999 | Skrivan et al. |
| 6,099,091 A | | 8/2000 | Campbell |
| 6,144,180 A | | 11/2000 | Chen et al. |
| 6,158,536 A | | 12/2000 | Misawa |
| 6,216,807 B1 | | 4/2001 | Eckhoff |
| 6,263,989 B1 | | 7/2001 | Won |
| 6,267,196 B1 | | 7/2001 | Wilcox et al. |
| 6,431,296 B1 | | 8/2002 | Won |
| 6,523,629 B1 | | 2/2003 | Buttz et al. |
| 6,619,414 B2 | | 9/2003 | Rau |
| 6,668,951 B2 | * | 12/2003 | Won ................... 180/9.1 |
| 6,999,849 B2 | | 2/2006 | Bridges |
| 7,083,013 B2 | | 8/2006 | Chuan |
| 2002/0062999 A1 | | 5/2002 | De-Noor et al. |
| 2002/0189871 A1 | | 12/2002 | Won |
| 2003/0183428 A1 | | 10/2003 | Hedeen |
| 2004/0168842 A1 | * | 9/2004 | Chuan ................. 180/65.2 |
| 2006/0037789 A1 | * | 2/2006 | Kritman et al. ......... 180/9.32 |
| 2007/0029117 A1 | * | 2/2007 | Goldenberg et al. ...... 180/9.32 |

FOREIGN PATENT DOCUMENTS

| | | | | |
|---|---|---|---|---|
| JP | 63203483 A | * | 8/1988 | |
| JP | 63203484 A | * | 8/1988 | |
| JP | 6032263 | | 2/1994 | |
| JP | 8152916 | | 6/1996 | |
| JP | 2003019985 A | * | 1/2003 | |
| JP | 2005111595 A | * | 4/2005 | |
| WO | WO 89/00928 | | 2/1989 | |

OTHER PUBLICATIONS

PackBot "Tactical Mobile Robot" Brochure.
PackBot "Hazardous Duty Mobile Robot" Brochure.
Autonomous Mobile Robots, Chapter 2; Locomotion Concepts Oct. 9, 2004.
Falcone et al. "The Personal Rover" The Robotics Institute Carnegie Mellon University Pittsburgh, PA 15213; 2002.

* cited by examiner

ROBOTIC VEHICLE DECK ADJUSTMENT

CROSS-REFERENCE TO RELATED APPLICATIONS

This U.S. patent application claims priority under 35 U.S.C. §119(e) to a U.S. provisional patent application 60/828,606 filed on Oct. 10, 2006, the entire contents of which are hereby incorporated by reference.

STATEMENT AS TO FEDERALLY SPONSORED RESEARCH

This invention was in part with Government support under contract N41756-06-C-5512 awarded by the Technical Support Working Group of the Department of Defense. The Government may have certain rights in the invention.

TECHNICAL FIELD

This disclosure relates to robotic vehicles.

BACKGROUND

A new generation of robotic systems and tools is required to meet the increasing terrorist threat in the US and abroad. The lack of adaptability and limited capability of existing remote controlled systems available to Hazardous/First Response/Explosive Ordnance Disposal (EOD) teams has frustrated many teams worldwide. The unique and often dangerous tasks associated with the first responder mission require personnel to make quick decisions and often adapt their tools in the field to combat a variety of threats. The tools must be readily available, robust, and yet still provide surgical precision when required.

SUMMARY

According to one aspect of the disclosure, a robotic vehicle includes a chassis having front and rear ends and supported on right and left driven tracks, each track trained about a corresponding front wheel rotatable about a front wheel axis. Right and left elongated flippers are disposed on corresponding sides of the chassis and operable to pivot about the front wheel axis of the chassis, each flipper having a driven track about its perimeter. A linkage connects a payload deck assembly, configured to support a functional, securely mounted and integrated payload (in some cases, modular payloads, unconnected payloads and/or functional payload), to the chassis. The linkage has a first end rotatably connected to the chassis at a first pivot, and a second end rotatably connected to the deck at a second pivot. Both of the first and second pivots include independently controllable pivot drivers operable to rotatably position their corresponding pivots to control both fore-aft position (as well as vertical position, the pivots being interconnected by a linkage that makes a swept motion) and pitch orientation of the payload deck assembly with respect to the chassis. In one example, the first pivot is rotatable through an angle of at least 180 degrees. The first pivot is not necessarily limited by a range of motion of the pivot, but rather by those positions in which the linkage, deck assembly, or payload interfere with part of the robot such as the chassis or with the ground—which may depend on the character of the ground and pose of the robot. Accordingly, in another implementation, the sweep of the linkage is limited by the chassis of the robot, which is configured as small tube element connecting chassis arms. The deck assembly and linkage may sweep between the chassis arms and between the flippers in either direction, and may sweep past a horizontal line defined by one chassis track wheel and bogey, in either direction fore or aft of the pivot. In another implementation, the sweep is limited to 74 degrees to improve stability and shock resistance on open ground. In each case, the payload deck assembly, with or without payload(s), may be tilted to move the center of gravity of the robot further in a desired direction. The linkage may comprise two parallel links spaced apart laterally.

The independently controllable pivot drivers provide both fore-aft position (and a wide sweep range) and pitch orientation of the payload deck assembly with respect to the chassis to selectively displace a center of gravity of the payload deck assembly both forward and rearward of a center of gravity of the chassis. This provides enhanced mobility to negotiate obstacles. Hereinafter, center of gravity or center of mass may be abbreviated "CG."

Rotation of the linkage about its first and second pivots enables selective positioning of a center of gravity or center of mass of the payload deck assembly both fore and aft the front wheel axis as well as both fore and aft of a center of gravity of the chassis. In one implementation, the first pivot of the linkage is located above and forward of the front wheel axis and swings the linkage for displacing the center of gravity of the payload deck assembly to a desired location. Furthermore, when the first end of the linkage is rotatably connected near the front of the chassis, the payload deck assembly is displaceable to an aftmost position in which the payload deck assembly is located within a footprint of the chassis.

In one example, the payload deck assembly includes connection points for both a functional payload power link and a functional payload communication link, which may comprise an Ethernet link. In one implementation, the functional payload communication link is a packet switched network connectable to a distribution switch or router.

The payload deck assembly includes an electronics bin (also "CG tub") which holds most of the electronics of the robot (as well as the upper motor(s) for tilting the paylaod deck assembly, but excepting motor control and drivers for the drive motors, which is housed in the chassis), and supports a dockable battery unit slid into the bottom of the electronics bin as well as a accepting a modular payload deck, which defines threaded holes to accept functional payloads and includes multiple functional payload connection pads positioned to accommodate selective connection of multiple functional payload units to the payload deck. Each connection pad includes connection points for both functional payload power and functional payload communication (as well as sufficient hard points nearby for such payloads to be secured to the deck with sufficient fasteners to reliably secure the mass of the payload through tilting operations of the deck). The payload deck can accept as a payload unit a removable radio receiver unit (which can communicate with a remote controller unit) operably connected to a drive system of the chassis. A battery unit is also removable secured to the bottom of the deck, so as to place the significant weight of batteries as low as possible in the mass that is used for shifting the center of gravity of the vehicle. In one example, the payload deck constitutes between about 30 and 50 percent of a total weight of the vehicle. The payload deck may also accept an Ethernet camera as a payload unit.

In one implementation, the payload deck further accepts as payload units removable sensor units. The sensor may be, for example, infrared, chemical, toxic, light, noise, and weapons detection.

The left and right flippers comprise elongated members, wherein flipper tracks are trained about corresponding rear wheels independently rotatable about the front wheel axis.

The robotic vehicle can climb a step by using the independently controllable pivot drivers to control both sweep and pitch orientation of the payload deck assembly with respect to the chassis to selectively displace the center of gravity of the payload deck assembly the both forward and rearward of the center of gravity of the chassis. The robotic vehicle may initiates a step climb by pivoting the first and second flippers upward to engage the edge of the step. Different obstacles can be accommodated by different strategies that use the full range of the sweepable and tiltable CG of the entire payload deck assembly, or of the payload deck assembly when combined with a payload. An advantage of the disclosed system is that the addition of payload weight on the payload deck assembly increases the flexibility and mobility of the robot with respect to surmounting obstacles of various shapes. The robotic vehicle also positions the center of gravity of the payload deck assembly above the front end of the chassis. Next, the robotic vehicle pivots the first and second flippers downward on the edge of the step to engage the top of the step and drives forward. The robotic vehicle continues to displace the center of gravity of the payload deck assembly beyond the front of the chassis by rotating both the first and second pivots. As shown in FIG. 14, tilting the deck assembly further advances the center of gravity of the entire vehicle. Finally, the robotic vehicle drives forward to pull the chassis over the edge of the step.

In another aspect of the disclosure, a skid steered robot includes a chassis supporting a skid steered drive and a set of driven flippers, each flipper being pivotable about a first pivot axis common with a drive axis of the chassis. A linkage substantially at the leading end of the chassis is pivotable about a second pivot axis. A deck assembly is pivotable about a third pivot axis substantially at a distal end of the linkage. The deck assembly includes a power supply, a packet network connection, a modular deck support structure; and a modular deck. The modular deck includes a deck mount which fits the modular deck support structure and at least two externally available common connectors. At least one of the deck assembly or modular deck includes a power supply switching circuit that switches available power from the power supply between the at least two common connectors, and a network switch that switches packet network traffic between the at least two common connectors.

In another aspect of the disclosure, a skid steered robot includes a set of driven flippers, each flipper being pivotable about a first pivot axis common with a drive axis of the chassis. A deck assembly, disposed above the chassis, includes a power supply, a packet network connection, a modular deck support structure, a deck wiring harness connector including packet network cabling and power cabling, and a modular deck. The modular deck includes a deck mount which fits the modular deck support structure, at least two externally available common connectors, a power supply switching circuit that switches available power from the power supply between at least two common connectors, a network switch that switches packet network traffic between the at least two common connectors, and a deck wiring harness that connects to the deck wiring harness connector and carries power and network to and from the modular deck.

In another aspect of the disclosure, a modular deck for a robotic vehicle includes a base configured to be secured to the vehicle, wherein the base receives both a power link and a communication link from the robotic vehicle. A platform configured to support a removable functional payload is secured to the base and has at least one connection point for both a functional payload power link and a functional payload communication link. The connection point is linked to both the base power link and the base communication link.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
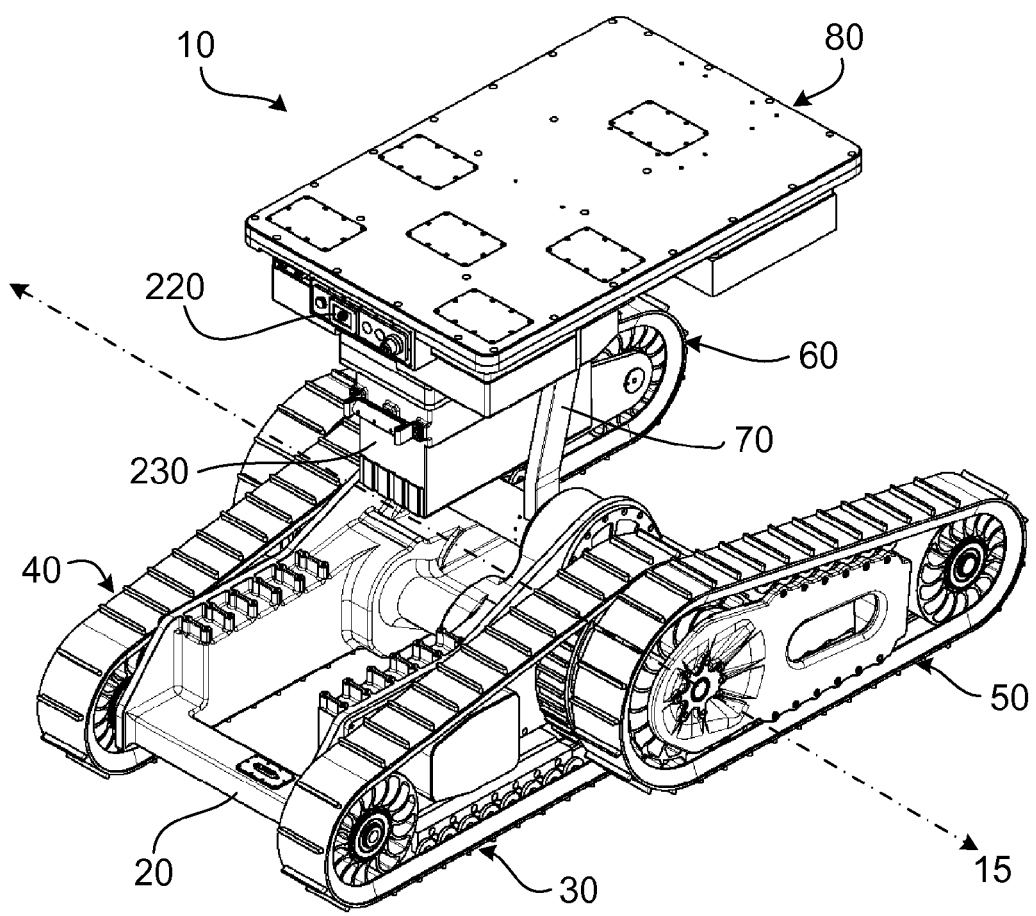
FIG. 1 is a perspective view of a robotic vehicle.

Referring to FIG. 1, a robotic vehicle 10, in one implementation, is a remotely operated vehicle that enables the performance of manpower intensive or high-risk functions (i.e., explosive ordnance disposal; urban intelligence, surveillance, and reconnaissance (ISR) missions; minefield and obstacle reduction; chemical/toxic industrial chemicals (TIC)/toxic industrial materials (TIM); etc.) without exposing operators directly to a hazard. These functions often require the robotic vehicle 10 to drive quickly out to a location, perform a task, and either return quickly or tow something back. The robotic vehicle 10 is operable from a stationary position, on the move, and in various environments and conditions.

Referring to FIGS. 1-6, a robotic vehicle 10 includes a chassis 20 that is supported on right and left drive track assemblies, 30 and 40 respectively, having driven tracks, 34 and 44 respectively. Each driven track 34, 44, is trained about a corresponding front wheel, 32 and 42 respectively, which rotates about front wheel axis 15. Right and left flippers 50 and 60 are disposed on corresponding sides of the chassis 20 and are operable to pivot about the front wheel axis 15 of the chassis 20. Each flipper 50, 60 has a driven track, 54 and 64 respectively, about its perimeter that is trained about a corresponding rear wheel, 52 and 62 respectively, which rotates about the front wheel axis 15.

Figure 7:
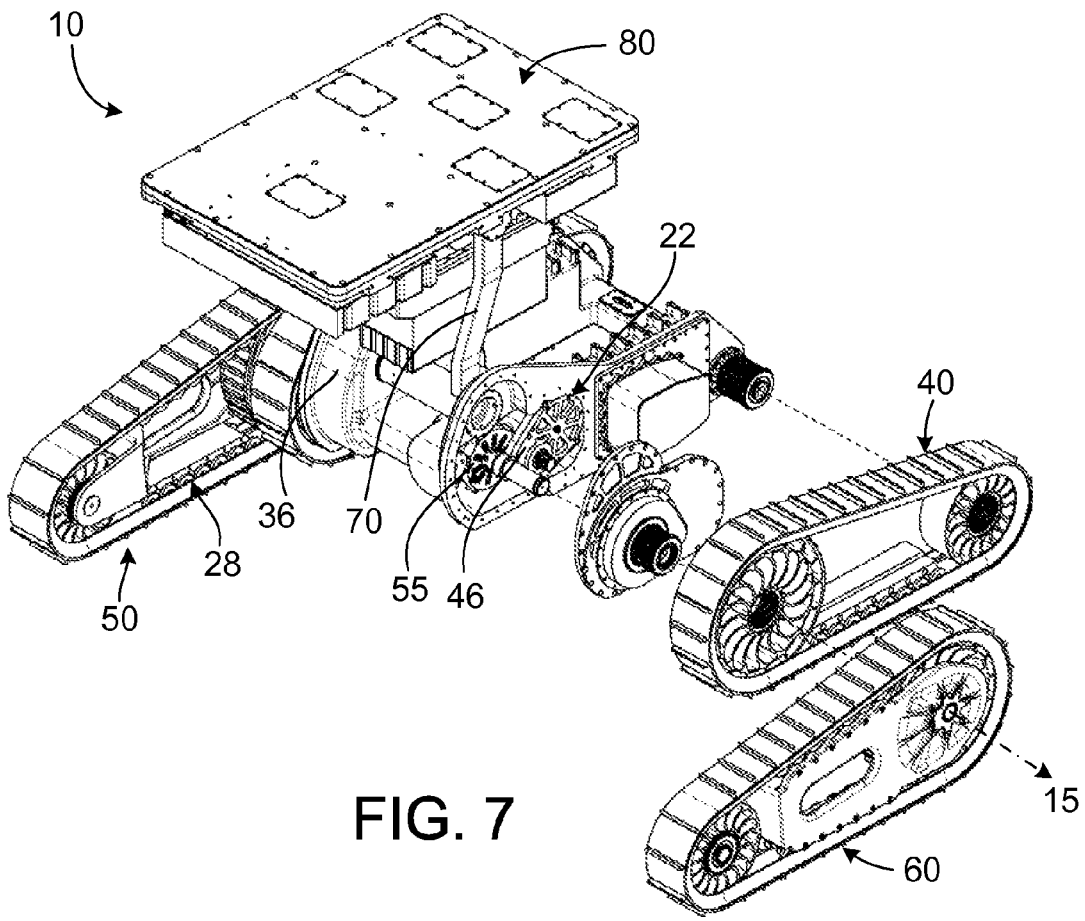
FIG. 7 is an exploded perspective view of the robotic vehicle.

Referring to FIG. 7, in one implementation, the robotic vehicle 10 includes right and left motor drivers, 36 and 46, driving corresponding drive tracks, 34 and 44, and flipper tracks, 54 and 64, which are supported between their front and rear ends by bogie wheels 28. A flipper actuator module 55 is supported by the chassis 20 and is operable to rotate the flippers, 50 and 60. In one example, the flippers 50, 60 are actuated in unison. In other examples, the flippers 50, 60 are actuated independently by right and left flipper actuators 55.

Figure 2:
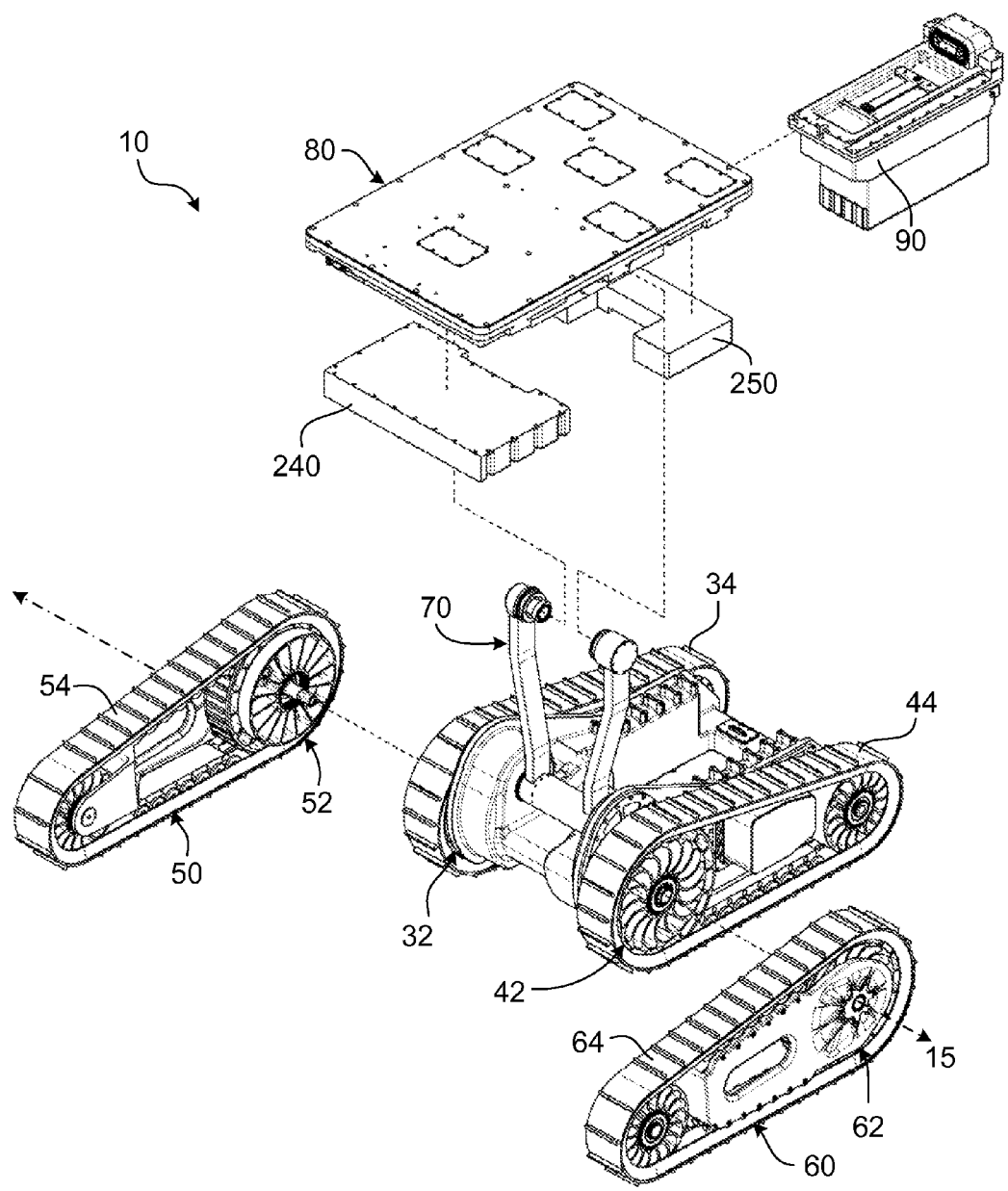
FIG. 2 is an exploded view of the robotic vehicle.
Figure 8:
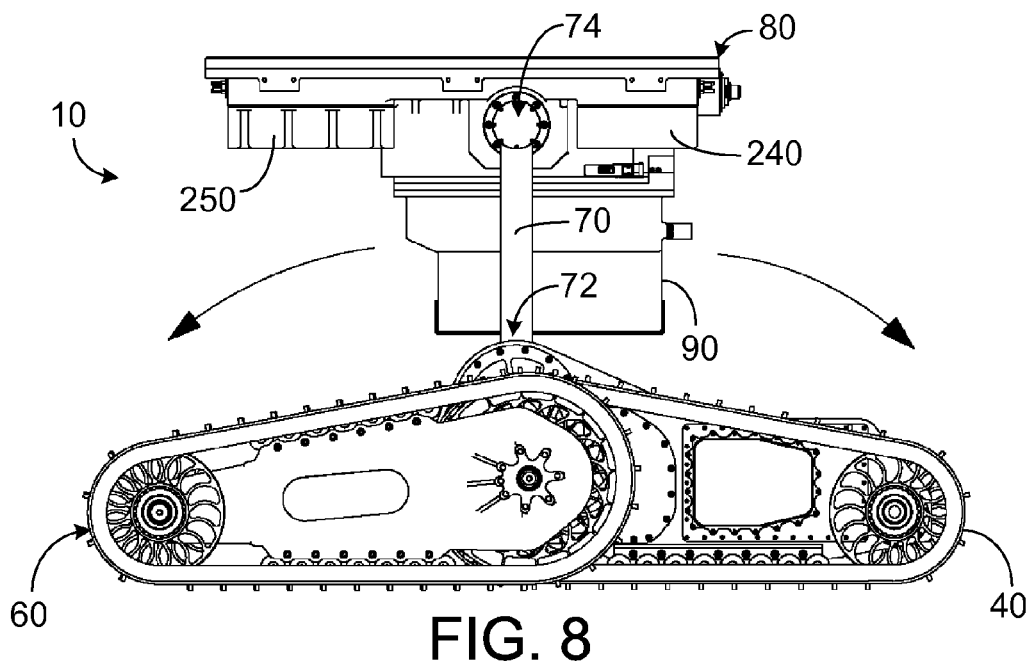
FIG. 8 is a side view of the robotic vehicle.

Referring to FIG. 8, a linkage 70 connects the payload deck assembly 80 to the chassis 20. The linkage 70 has a first end 70A rotatably connected to the chassis 20 at a first pivot 71, and a second end 70B rotatably connected to the payload deck 80 at a second pivot 73. Both of the first and second pivots, 71 and 73 respectively, include respective independently controllable pivot drivers, 72 and 74, operable to rotatably position their corresponding pivots to control both fore-aft position and pitch orientation of the payload deck assembly 80 with respect to the chassis 20. As shown in FIGS. 1-2, the linkage 70 may comprise two parallel links spaced apart laterally.

Figure 9:
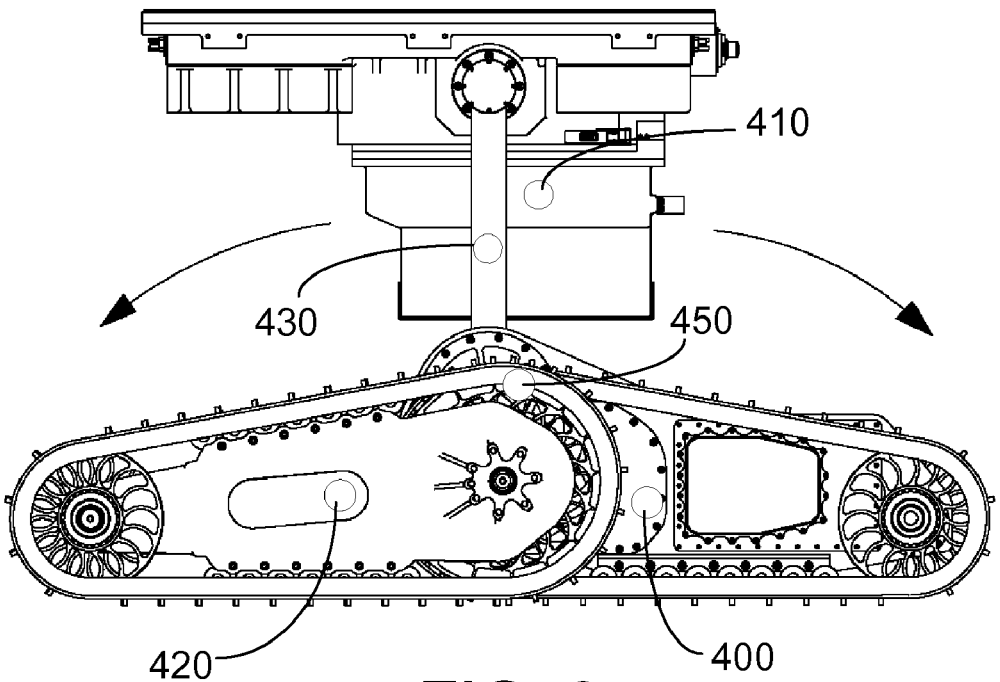
FIG. 9 is an side view of the robotic vehicle.

Referring to FIG. 9, the first end 70A of the linkage 70 is rotatably connected near the front of the chassis 20 such that the payload deck assembly 80 is displaceable to an aftmost position in which the payload deck assembly 80 is located within a footprint of the chassis 20. Furthermore, as shown in FIGS. 1-2, the first pivot 71 of the linkage 70 is located above and forward of the front wheel axis 15. The first pivot 71 is rotatable through an angle of at least 180 degrees (optionally, 74 degrees), in one example. Rotation of the linkage 70 about its first and second pivots, 71 and 73 respectively, enables selective positioning of center of gravity 410 of payload deck assembly 80 both fore and aft front wheel axis 15 as well as both fore and aft a center of gravity 400 of the chassis 20. In another example, the independently controllable pivot drivers 72, 74 provide both fore-aft position (as part of sweep) and pitch orientation of the payload deck assembly 80 with respect to the chassis 20 to selectively displace the center of gravity 410 of the payload deck assembly 80 both forward and rearward of the center of gravity 400 of the chassis 20, displacing a center of gravity 450 of the entire robot 10.

Figure 3:
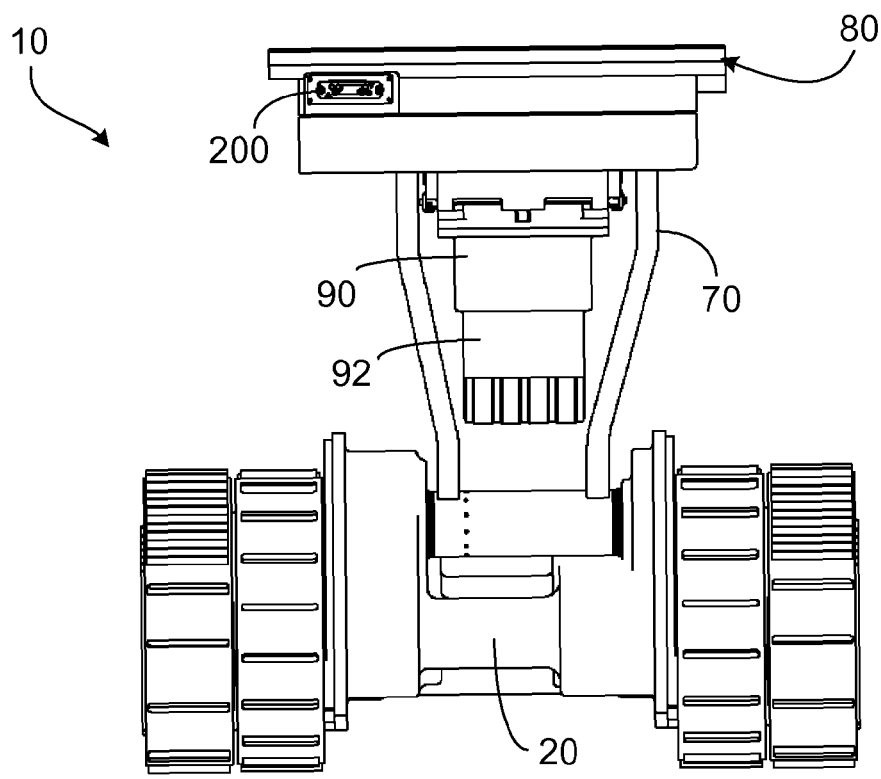
FIG. 3 is a front view of the robotic vehicle.
Figure 6:
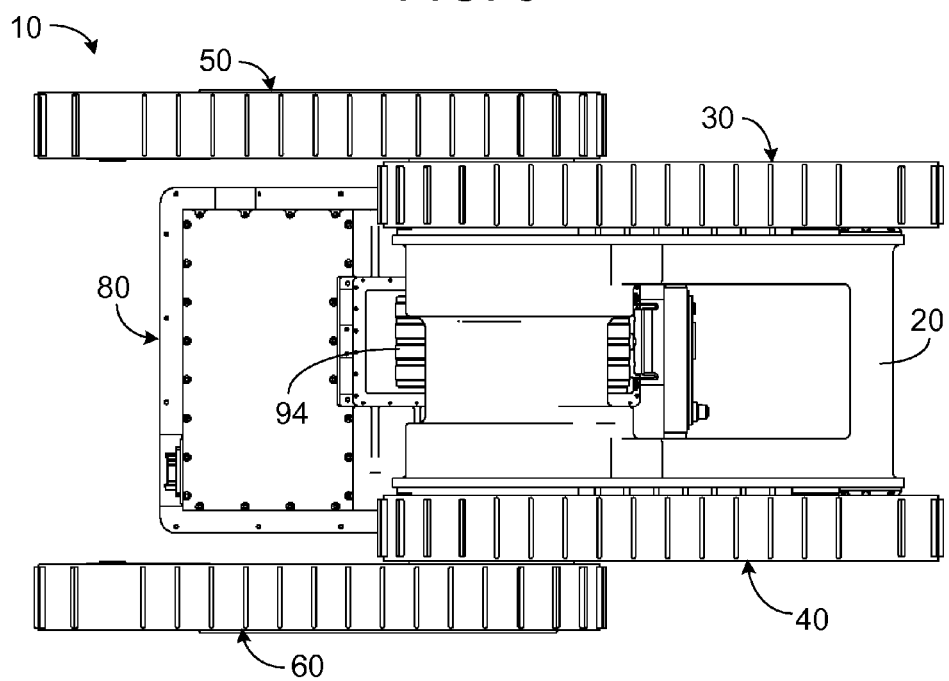
FIG. 6 is a bottom view of the robotic vehicle.

The robotic vehicle 10 is electrically powered (e.g. a bank of nine standard military BB-2590 replaceable and rechargeable lithium-ion batteries). Referring to FIGS. 2-3, the payload deck assembly 80, specifically the electronics tub 90, accommodates a slidable, removable battery unit 92. Skid pad 94, as shown in FIG. 6, may be secured to the bottom of the battery unit 92 to protect the battery 92 and aid manageability. The payload deck assembly 80 may carry an additional battery supply on one of the selectable connection pads 810, increasing the available power capacity (e.g. an additional bank of nine batteries may be carried on payload deck).

Figure 4:
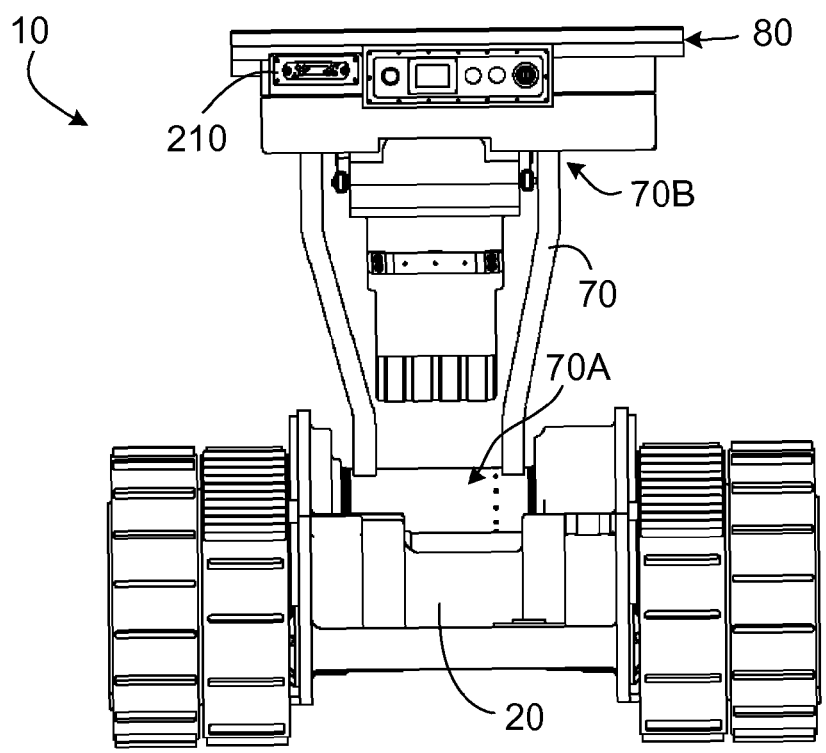
FIG. 4 is a back view of the robotic vehicle.

Referring again to FIGS. 2-6, a payload deck assembly 80, including an electronics bin 90 and payload deck 806 (D1, D2, D3 in other drawings herein), is configured to support a removable functional payload 500. FIGS. 3-4 illustrate the robotic vehicle 10 with the payload deck assembly 80 including front and rear functional payload power connectors, 200 and 210, and a user interface panel 220. FIG. 2 illustrates one example where the payload deck assembly 80 includes front and rear sensor pods, 240 and 250 respectively. In some implementations, the sensor pods 240, 250 provide infrared, chemical, toxic, light, noise, and weapons detection, as well as other types of sensors and detection systems. A primary driving sensor may be housed in a separate audio/camera sensor module mounted to the payload deck assembly 80 that contains at least one visible spectrum camera. Audio detection and generation is realized using an audio/camera sensor module mounted to the payload deck assembly 80, in one example.

Figure 5:
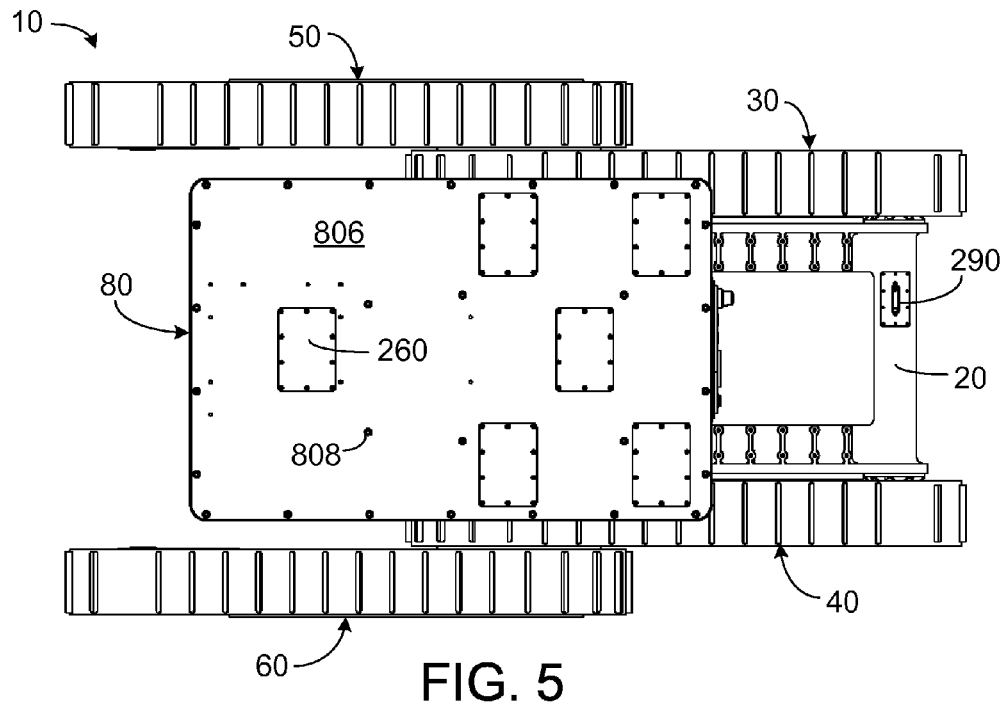
FIG. 5 is a top view of the robotic vehicle.

In some implementations, robotic vehicle 10 tows a trailer connected to rear payload connector 290, as shown in FIG. 5. Exemplary payloads for the trailer include a small generator, which significantly extends both range and mission duration of robotic vehicle, field equipment, and additional functional payload units 500 attachable to the payload deck assembly 80.

The payload deck assembly 80 accepts the mounting of one or more functional payload modules 500 that may include robotic arms, chemical, biological and radiation detectors, and a sample container. The robotic vehicle 10 automatically detects the presence and type of an installed functional payload 500 upon start-up. Referring to FIG. 5, the payload deck 806 defines threaded holes 808 to accept a functional payload 500. FIG. 5 also illustrates one or more functional payload connection pads 810 positioned on the payload deck assembly 80 to accommodate selective connection of multiple functional payload units 500. Each functional payload connection pad 810 delivers power, ground and communications to a functional payload unit 500. For example, robotic vehicle 10 may provide up to 300 W (threshold), 500 W (goal) of power to a payload 500 at 42V, up to 18 A. The communication link may include Ethernet link communications. In one example, payload deck assembly 80 constitutes between about 30 and 70 percent of the vehicle's total weight. The payload deck assembly 80 further includes a removable controller unit 350 operably connected to a drive system (e.g. the motor drivers 36, 46) of the chassis 20. The robotic vehicle 10 communicates with an operator control unit (OCU) through optional communication functional payload module(s) 500. The robotic vehicle 10 is capable of accepting and communicating with a radio functional payload module 500.

Figure 10:
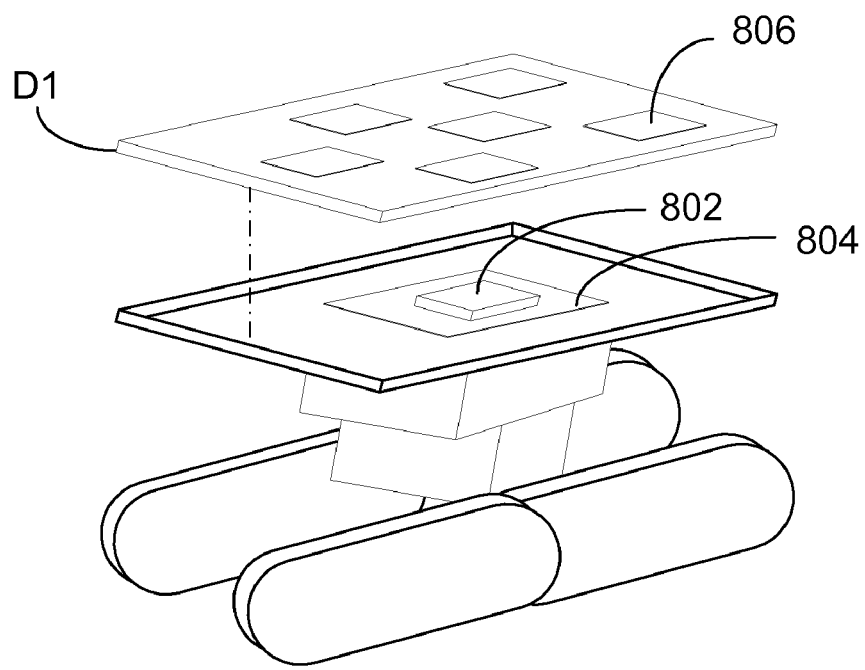
FIG. 10 is a perspective view of a payload deck for a robotic vehicle.
Figure 11:
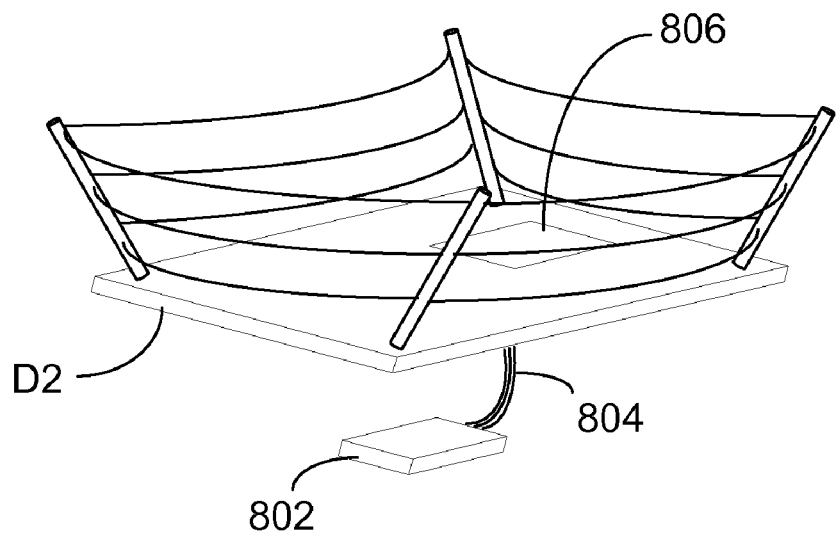
FIG. 11 is a perspective view of a payload deck for a robotic vehicle.
Figure 12:
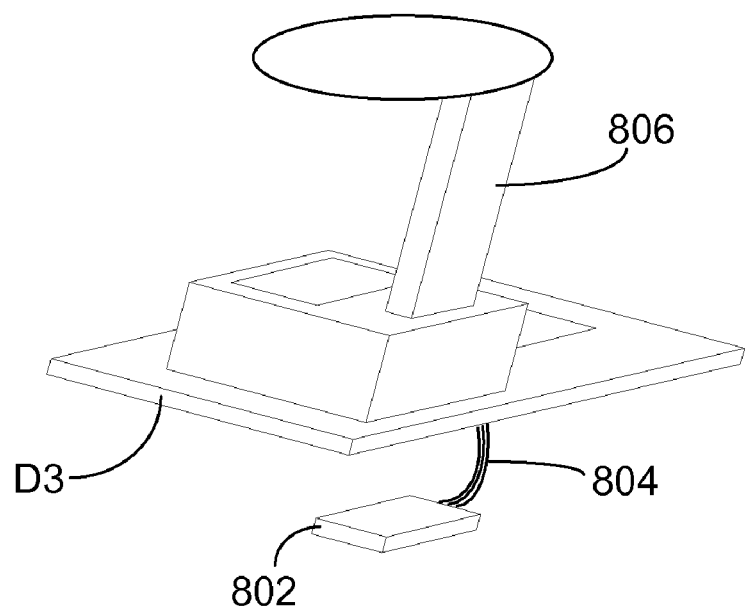
FIG. 12 is a perspective view of a payload deck for a robotic vehicle.
Figure 17:
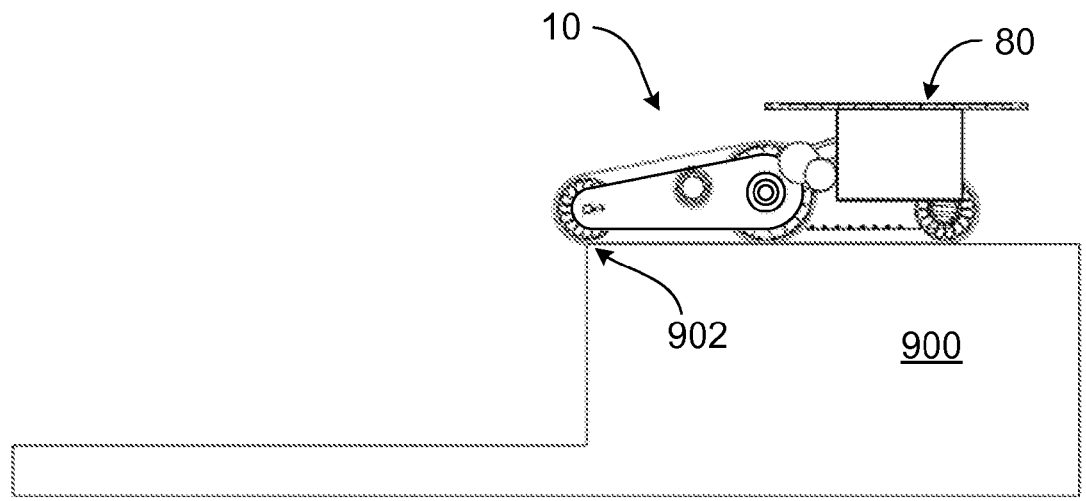
Figure 18:
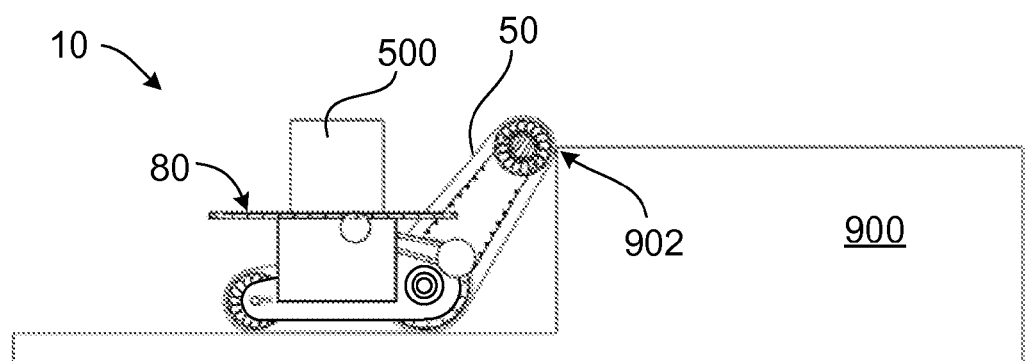
FIGS. 18-21 are side views of a robotic vehicle climbing.
Figure 19:
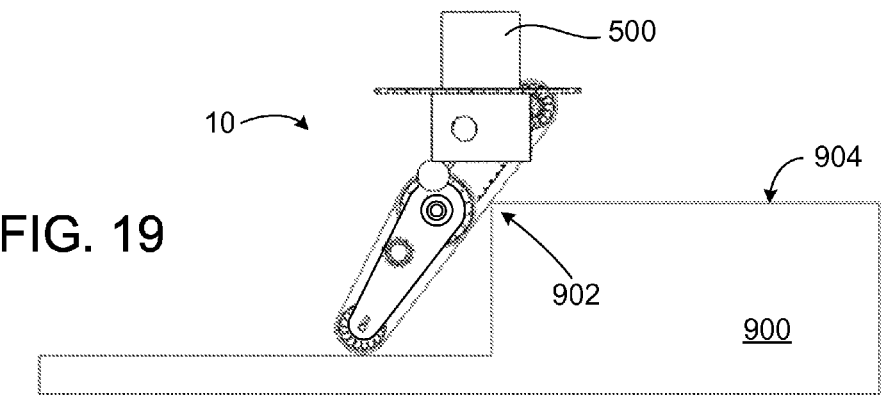
Figure 20:
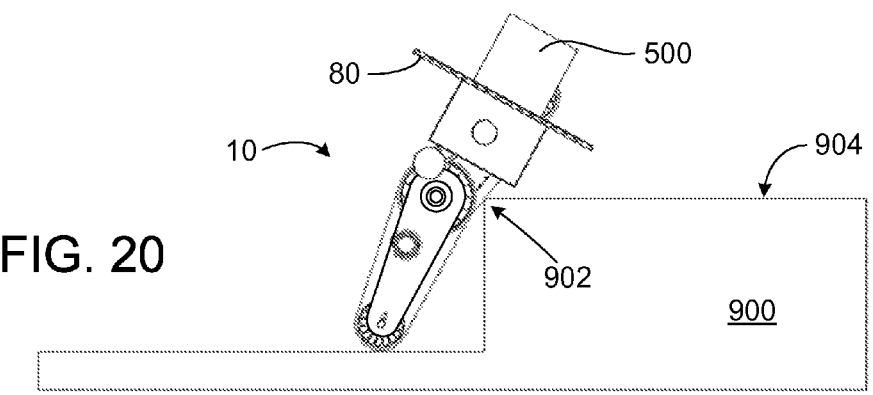
Figure 21:
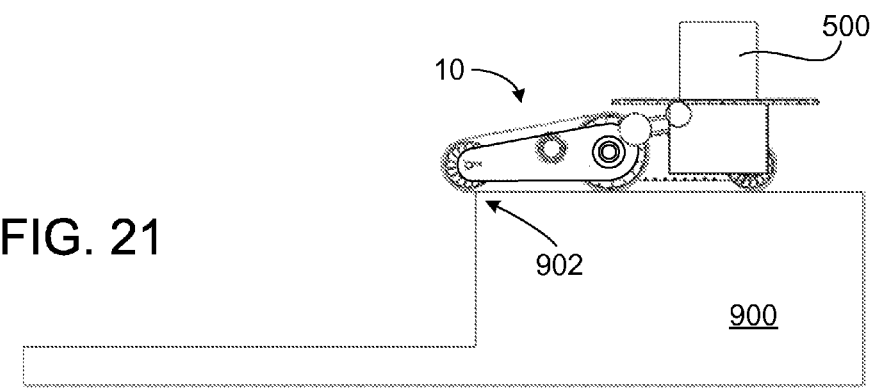

Referring to FIGS. 10-12, modular decks D1, D2, D3 are removable payload decks 806 modularly secured to the electronics bin 90 to form the payload deck assembly 80. The modular decks D1, D2, D3 maintain connectivity to functional payloads 500 located on the decks D1, D2, D3 while allowing interchangeability with a payload deck assembly base 805. The modular decks D1, D2, D3 receive power and communication from a deck connector 802 attached by a wiring harness 804. FIG. 17 depicts a development deck D1 including sparsely spaced connector pads 806. FIG. 18 depicts a mule deck D2 including netting 808 for carrying loads and at least one connector pad 806. FIG. 19 depicts a manipulator deck D3 including an integral bracing 810 for a large manipulator arm. The integral bracing 810 housing at least one connector pad 806. The connectors pads 806 available on the decks D1, D2, D3 each carry 42V, up to 18 A power; ground; and Ethernet, for example. FET switches connected to each connector pad 806 are overload protected and are controlled by a digital signal processor (DSP) on the deck to distribute power. The DSP is controlled via a controller area network (CAN) bus, a known industrial and automotive control bus.

Figure 13:
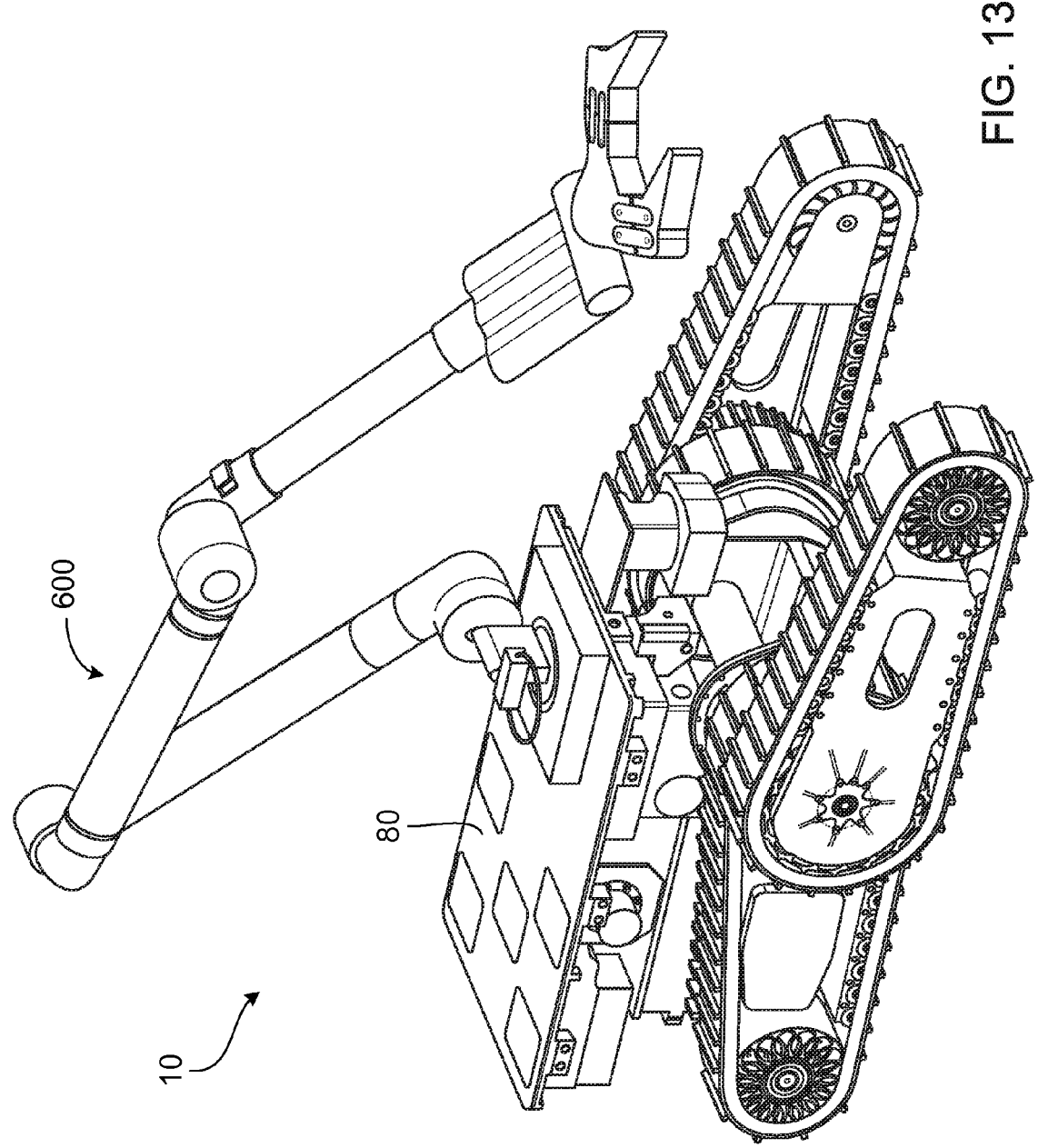
FIG. 13 is a perspective view of the robotic vehicle with a manipulator arm.

FIG. 13 illustrates a robotic arm module 600 as a functional payload 500 attached to the payload deck assembly 80. The robotic arm module 600 provides full hemispherical reach (or more, limited only by interference; or less, limited by other needs of the robot 10) around the robotic vehicle 10. The robotic arm module 600 provides lifting capacity and an additional means for shifting the robotic vehicle's center of gravity 450 forward, e.g. when ascending steep inclines, and rearward, e.g. for additional traction.

The robotic vehicle 10 may sense elements of balance through the linkage 70 (e.g., via motor load(s), strain gauges, and piezoelectric sensors), allowing an operator or autonomous dynamic balancing routines to control the center of gravity 410 of the payload deck assembly 80 and the center of gravity 430 of the linkage 70 for enhanced mobility, such as to avoid tip over while traversing difficult terrain.

Figure 14:
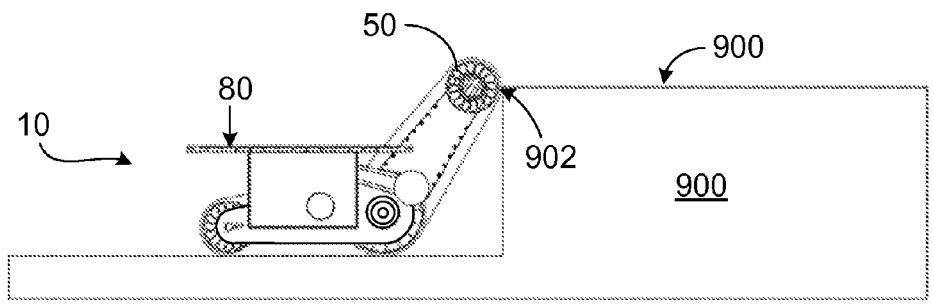
FIGS. 14-17 are side views of a robotic vehicle climbing.
Figure 15:
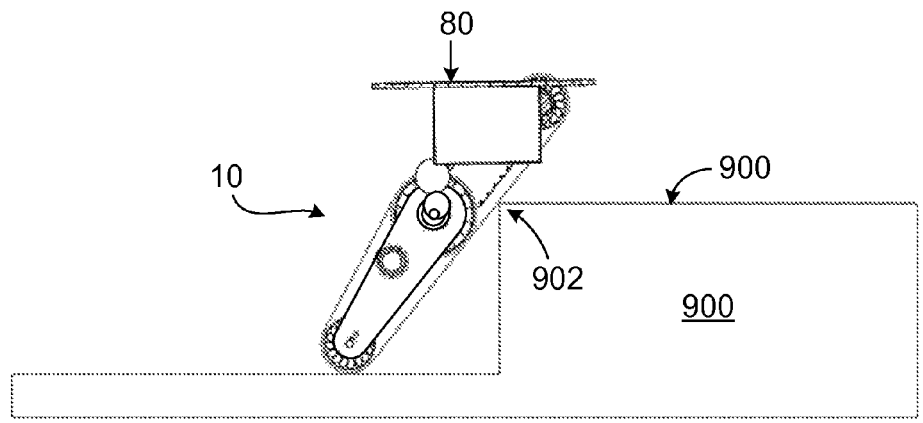
Figure 16:
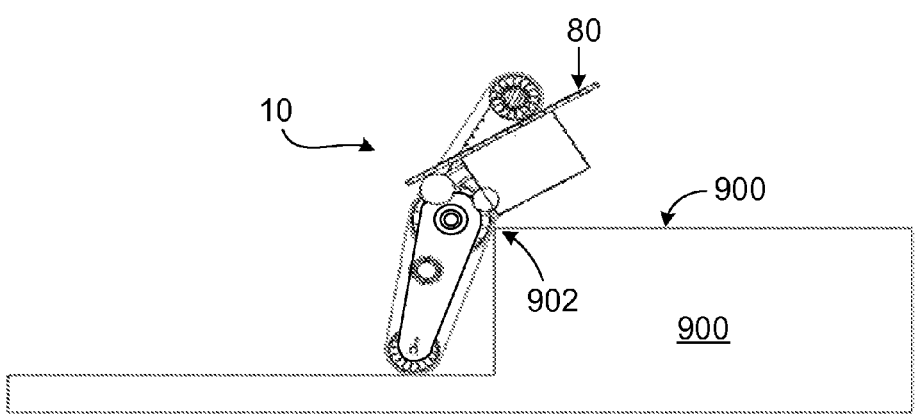

FIGS. 14-17 illustrate the robotic vehicle 10 climbing a step by using the independently controllable pivot drivers 72 and 74 to control both fore-aft position and pitch orientation of the payload deck assembly 80 with respect to the chassis 20 to selectively displace the center of gravity 410 of the payload deck assembly 80 both forward and rearward of the center of gravity 400 of the chassis 20. Referring to FIG. 14, in step S1, the robotic vehicle 10 initiates step climbing by pivoting the first and second flippers 50 and 60, respectively, upward to engage the edge 902 of the step 900. The robotic vehicle 10 also positions the center of gravity 410 of the payload deck assembly 80 above the front end of chassis 20. Next, as shown in FIGS. 15-16, in steps S2 and S3, the robotic vehicle 10 pivots the first and second flippers 50 and 60 downward on the edge 902 of the step 900 to engage the top 904 of the step and drives forward. In FIG. 15, illustrating step S2, the payload deck assembly 80 is further tilted to advance the center of gravity 450 of the robot 10 (permitting higher obstacles to be climbed). In step S3, the robotic vehicle 10 continues to displace the center of gravity 410 of the payload deck assembly 80 beyond the front of the chassis 20, as shown in FIG. 16, by rotating both the first and second pivots, 71 and 73 respectively. Finally, in step S4, as shown in FIG. 17, the robotic vehicle 10 drives forward to pull the chassis 20 over the edge 902 of the step 900. FIGS. 18-21 illustrates the robotic vehicle 10 initiating and completing steps S1-S4 for obstacle climbing with a functional payload 500 secured to the payload deck assembly 80.

Figure 22:
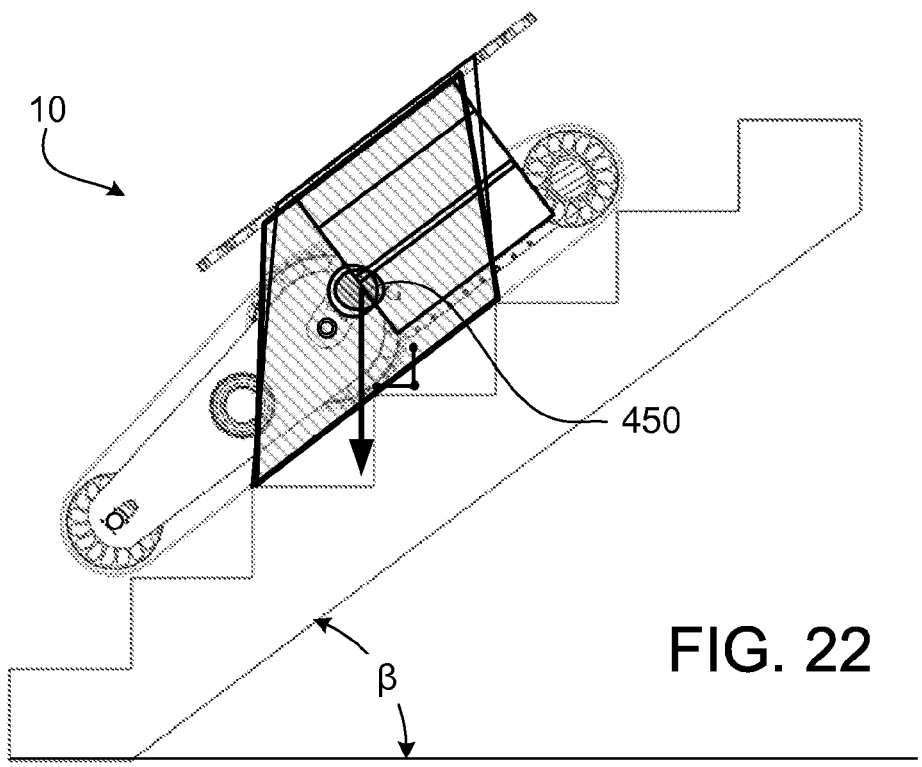
FIG. 22 is a side view of a robotic vehicle climbing stairs.
Figure 23:
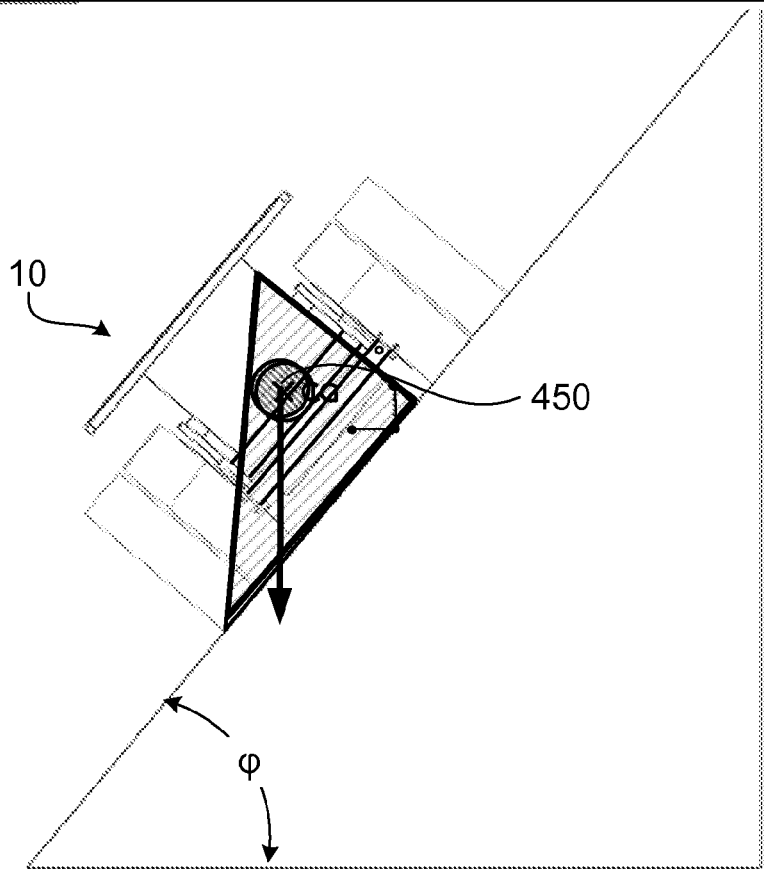
FIG. 23 is a front view of a robotic vehicle traversing an incline.

In some implementations, the robotic vehicle 10 is configured to negotiate obstacles, curbs and steps having a height of about 0.3 m (12 inches), and across a horizontal gap of about 0.61 m (24 inches). The robotic vehicle 10 has side-to-side horizontal dimensions smaller than standard exterior doorways (e.g. 32 inches) and interior doors (e.g. 30 inches). Referring to FIGS. 22-23, the robotic vehicle 10 is configured as to ascend and descend a flight of stairs having up to a climb angle, β, of about 37 degrees, as well as climb and descend an inclined slope, including stopping and starting, on a hard dry surface slope angle, β, of about 50 degrees. Similarly, the robotic vehicle 10 is physically configured as described herein to climb and descend, including stopping and starting, an inclined grass covered slope having an angle, β, of about 35 degree grade. The robotic vehicle 10 is configured to laterally traverse, including stopping and starting, on a grass slope angle, φ, of about 30 degrees. Furthermore, the robotic vehicle 10 is configured to maneuver in standing water (fresh/sewage) having a depth of about 0.3 m (12 inches) and maintain a speed of about 20 kph (12 mph) on a paved surface, and about 8 kph (5 mph) through sand and mud.

The robotic vehicle 10 supports assisted teleoperation behavior, which prevents the operator from hitting obstacles while using on board obstacle detection/obstacle avoidance (ODOA) sensors and responsive ODOA behaviors (turn away; turn around; stop before obstacle). The robotic vehicle 10 assumes a stair climbing pose, as illustrated in FIG. 13, or a descending preparation pose (similar to the pose shown in FIG. 13, but with the flippers 50, 60 pointing downward) when a stair climbing or stair descending assist behavior is activated, respectively. The robotic vehicle 10 stair climbing behaviors can be configured to control (tilt) the flippers 50, 60 and control the position of the center of gravity shifter 70 as the robot 10 negotiates stairs. A stair climbing assist behavior keeps the robotic vehicle 10 on a straight path up stairs and, in one example, may maintain a roll angle of about zero degrees.

The robotic vehicle's 10 control software provides autonomous capabilities that include debris field mapping, obstacle avoidance, and GPS waypoint navigation. The robotic vehicle 10 can determine position via a global positioning system (GPS) receiver, housed in a separate sensor module 500.

The robotic vehicle 10 is fully operational after exposure to a temperature range of about −40° C. to about 71° C. (−40° F. to 160° F.) in a non-operating mode and is fully operational in a temperature range of about −32° C. to about 60° C. (−26° F. to 140° F.). The robotic vehicle operates during and after exposure to relative humidity up to about 80 percent, in varied weather conditions. The robotic vehicle 10 also operates during and after exposure to blowing sand and/or rain, freezing rain/ice, and in snowfall up to about 0.1 m (4 inches) in depth.

Figure 24:
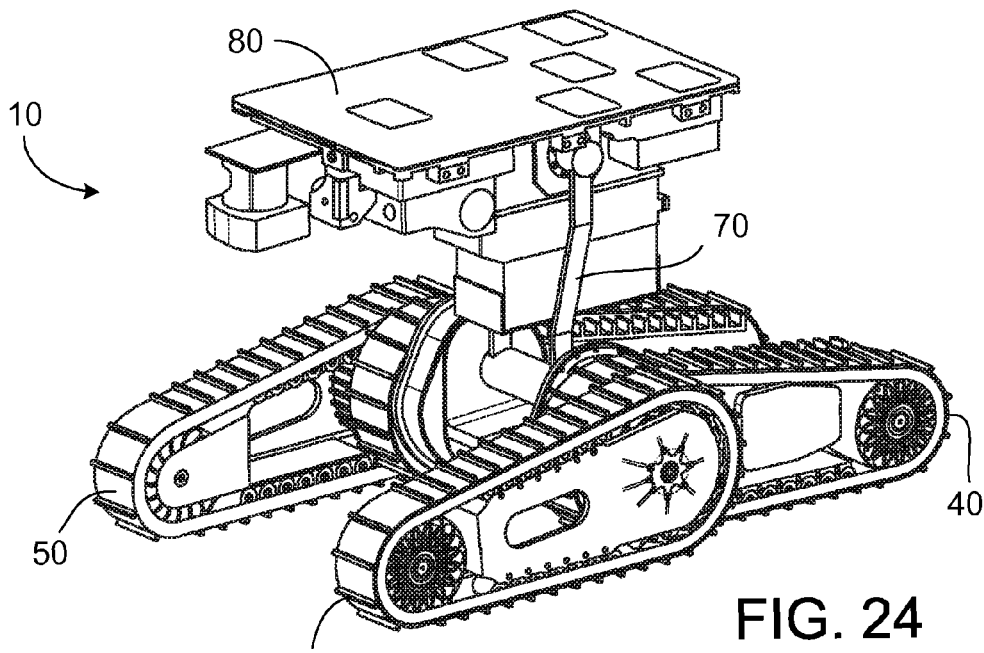
FIG. 24 is a perspective view of a robotic vehicle in a neutral posture.
Figure 25:
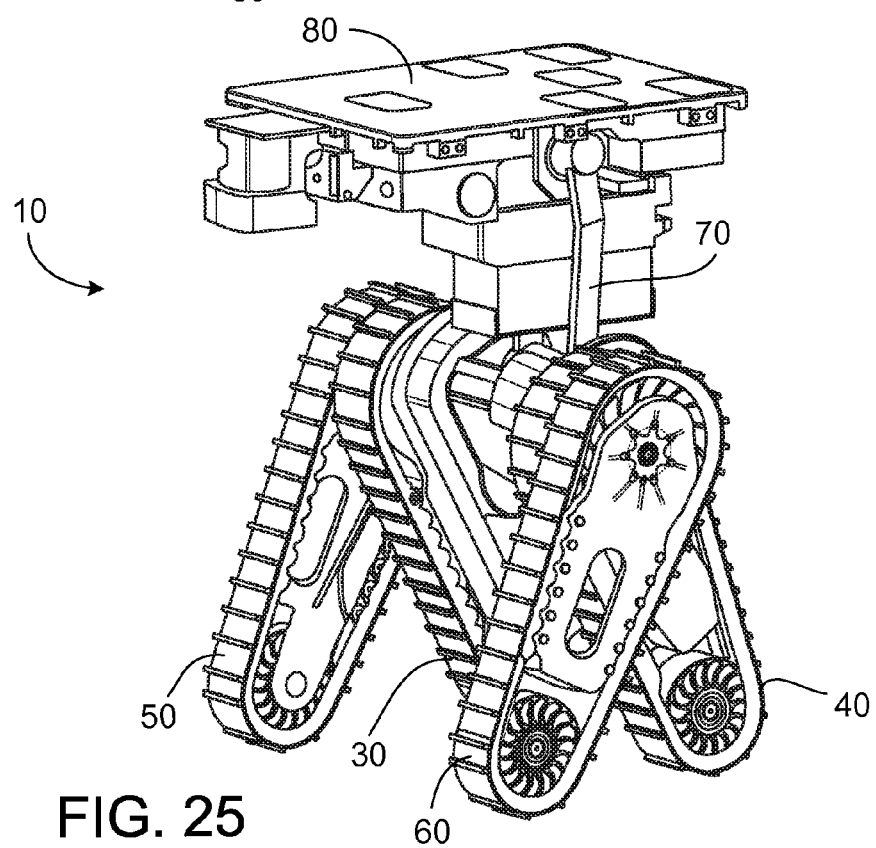
FIG. 25 is a perspective view of a robotic vehicle in a standing posture.
Figure 26:
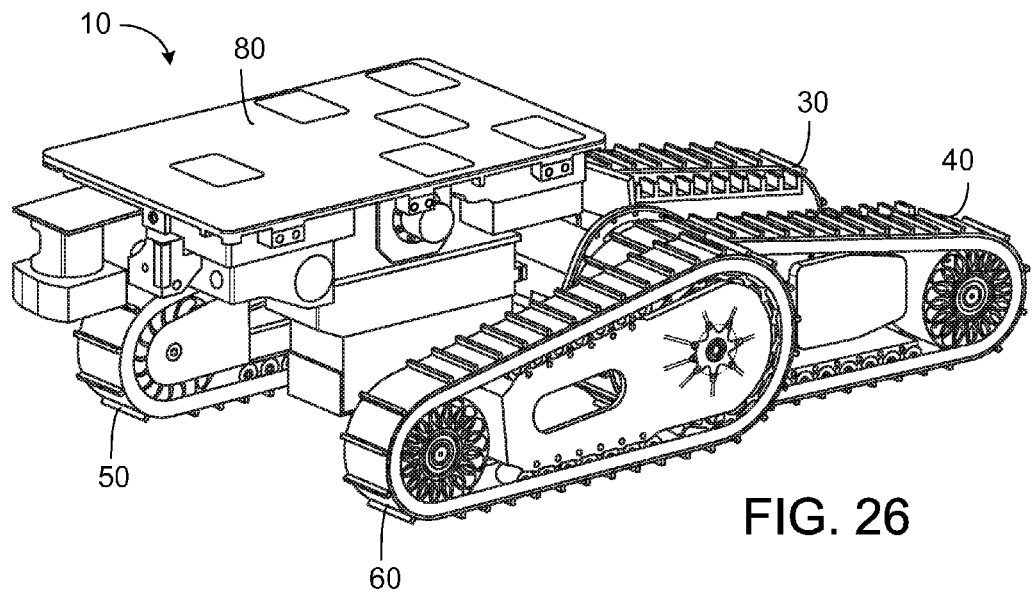
FIG. 26 is a perspective view of a robotic vehicle in a kneeling posture.
Figure 27:
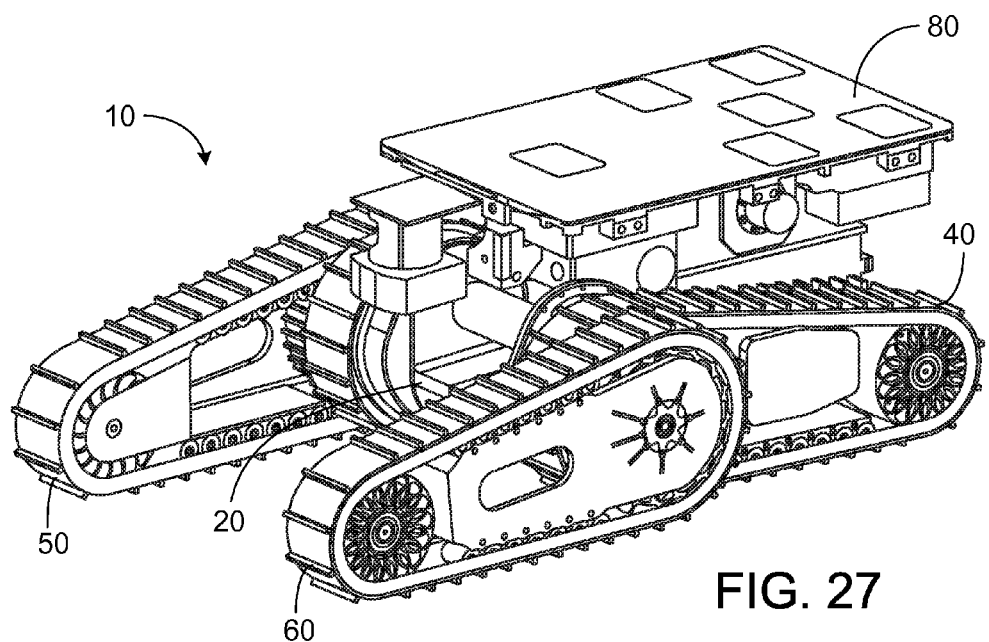
FIG. 27 is a perspective view of a robotic vehicle in a kneeling posture.

Referring to FIGS. 24-28, the robotic vehicle 10 may exhibit a variety of postures or poses to perform tasks and negotiate obstacles. The linkage 70 together with the deck assembly 80, chassis 20, and flippers 50, 60 all move to attain a number of standing postures. FIG. 24 depicts robotic vehicle 10 in a neutral posture. FIG. 25 depicts the robotic vehicle 10 in one standing posture wherein the distal end of flippers 50 and 60 approaches the leading end of the chassis 20 to form an acute angle between the flippers 50 and 60 and the chassis 20. The linkage 70 is entirely above a common axis 15 of the flippers 50 and 60 and the chassis 20. In one example, the deck assembly 80 tilts independently with respect to the robotic vehicle 10. The acute angle achieved between the flippers 50 and 60 and the chassis 20 varies the standing positions without changing the orientation of the deck assembly 80 with respect to the ground. In some examples, the linkage 70 is positionable at least parallel to an imaginary line between the distal and pivot ends of flippers 50 and 60. In additional examples, the second end 70B of the linkage 70 is positionable below an imaginary line between the distal and pivot ends of flippers 50 and 60. In another implementation, the linkage 70 together with the deck assembly 80, chassis 20, and flippers 50 and 60 can move to attain a first kneeling position, as shown in FIG. 26, and a second kneeling position, as shown in FIG. 27.

Figure 28:
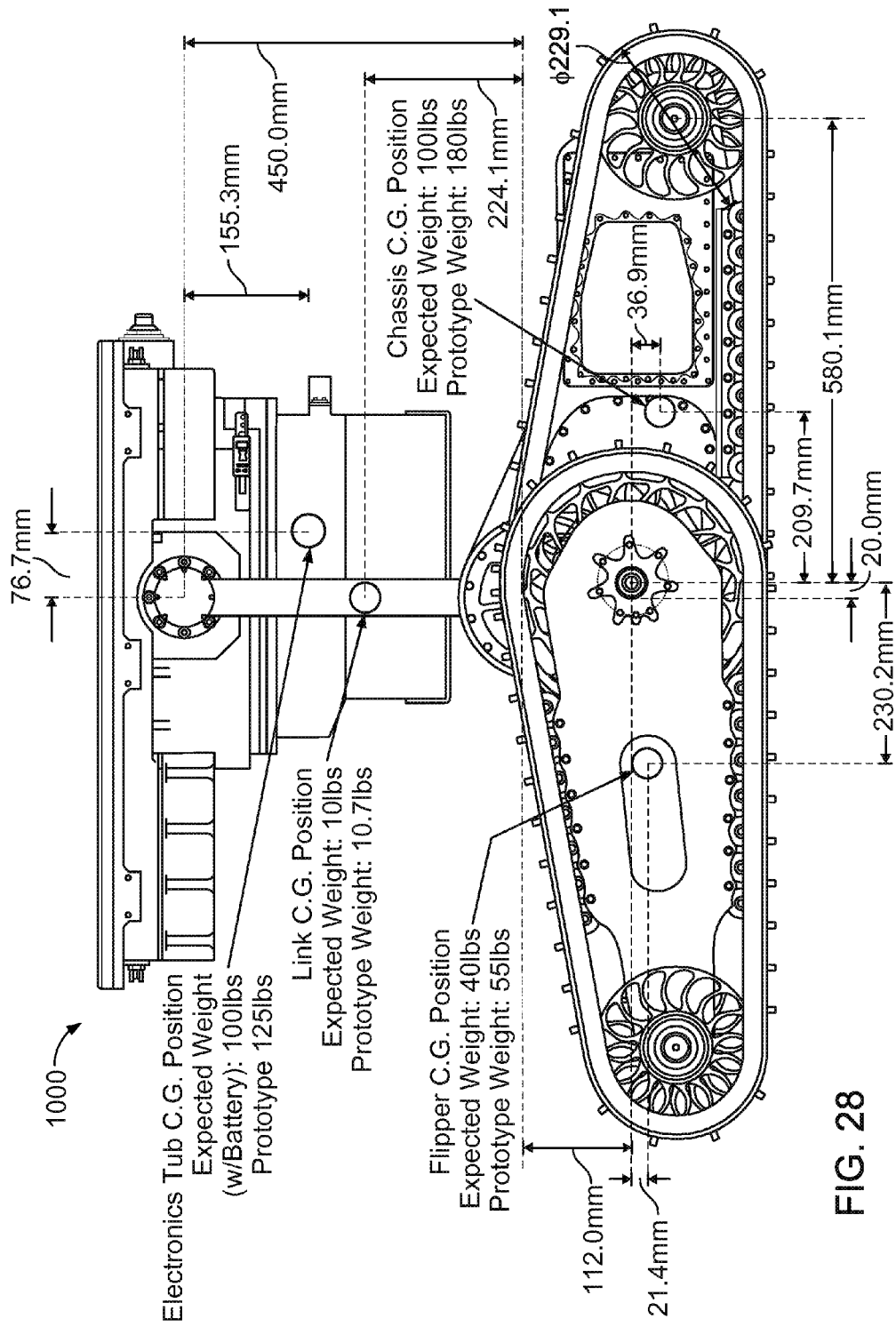
FIG. 28 is a side view of a robotic vehicle.

FIG. 28 illustrates an implementation of centers of gravity of a robotic vehicle 1000 and distances between them. The locations of the centers of gravity within the chassis 20, deck 80, linkage 70, and flippers 50 and 60 and with respect to each other individually may be varied to attain a number of advantages in terms of maneuverability and the ability to perform certain tasks.

There are several advantages to the present "two-bar" linkage 70 (having independent, powered pivots 71, 73 at the deck assembly end 70B and the chassis end 70A of the linkage 70) with respect to other structures for shifting a center of gravity.

For example, a robot equipped with a "two-bar" linkage 70 can scale higher obstacles relative to a robot without such a linkage. In order to do so, the deck assembly 80 is tilted and/or pivoted further forward, moving the overall center of gravity 450 higher and farther forward. A robot equipped with the two-bar linkage 70 can scale higher obstacles when bearing a payload 500 on top of the deck assembly 80 than without a payload 500. A high, heavy payload 500 can be tipped with the two-bar linkage 70 to provide a more pronounced shift of the center of gravity 450 forward than an empty deck assembly 80. The two bar linkage 70 may raise the deck assembly 80 and an attached a sensor pod module 500 higher in a standing position, as shown in FIG. 25, even with a level deck, because the linkage 70 is connected at one point 73 at the top of the range and also at one point 71 at the bottom of the range. This is valuable because the linkage 70 may place a sensor such as a camera, perception sensor (e.g., laser scanner) or payload sensors 500 relatively higher. Other linkage systems may require connection at more than one point, which may limit the height and/or may also tilt the deck assembly 80 at the highest position while in the standing position.

A two bar linkage 70 has a theoretical pivot range, limited only by interference with other parts of the robot, of greater than 180 degrees. If positioned concentrically with the flipper-chassis joining axis 15, the linkage rotation range could be 360 degrees. Other constraints designed herein and other advantages obtainable in other positions can change this. For example, if the first pivot 71 of the linkage 70 is positioned above and forward of the common chassis-flipper axis 15 (e.g., about 20 mm forward and about 70 mm above), it is possible to have a unitary structure for the chassis 20 (casting).

A straight shaft may join both flippers 50,60 directly, allowing the bottom pivoting actuator 72 to be placed off center with the flipper actuator 55. Additional pivot range past 180 degrees may be obtained, as with additional standing height, by increasing the distance between the first pivot 71 and the common chassis-flipper axis 15.

Other systems may have a range of considerably less than 180 degrees, for example if the parts of such systems are limited in a pivoting or movement range by interference among the system members. Still further, a two bar linkage has a longer effective forward extending range, since the linkage 70 is substantially stowable to the chassis 20. The distance between more than one chassis connections of the other systems may shorten the effective forward extending range. As one additional advantage, a deck-side actuator 74 of the two-bar linkage 70 can be used to "nod" (auxiliary scan) a scanning (main scanning) sensor such as a 2D LADAR or LIDAR to give a 3D depth map.

Other robotic vehicle details and features combinable with those described herein may be found in a U.S. Provisional filed Oct. 6, 2006, entitled "MANEUVERING ROBOTIC VEHICLES" and assigned Ser. No. 60/828,611, the entire contents of which are hereby incorporated by reference.

A number of implementations of the invention have been described. Nevertheless, it will be understood that various modifications may be made without departing from the spirit and scope of the invention. For example, flippers of varied length and payload decks with other means of functional payload attachment, such as snap-on, clamps, and magnets. Accordingly, other implementations are within the scope of the following claims.

What is claimed is:

1. A robotic vehicle comprising:
    a chassis having front and rear ends and supported on right and left driven tracks, each track trained about a corresponding front wheel rotatable about a front wheel axis;
    right and left elongated flippers disposed on corresponding sides of the chassis and operable to pivot about the front wheel axis of the chassis, each flipper having a driven track about its perimeter;
    a payload deck configured to support a removable payload;
    a linkage connecting the payload deck to the chassis, the linkage having a first end rotatably connected to the chassis at a first pivot, and a second end rotatably connected to the deck at a second pivot, both of the first and second pivots including independently controllable pivot drivers operable to rotatably position their corresponding pivots to control both fore-aft position and pitch orientation of the payload deck with respect to the chassis; and
    a controller disposed on the payload deck connected to the chassis by the linkage, and operably connected to motor drivers of the chassis to drive the right and left tracks;
    wherein the independently controllable pivot drivers provide both fore-aft position and pitch orientation of the payload deck with respect to the chassis to selectively displace a center of gravity of the payload deck relative to a center of gravity of the chassis,
    and wherein rotation of the linkage about its first and second pivots enables selective positioning of the center of gravity of the payload deck to both fore and aft of each of both the front wheel axis and the center of gravity of the chassis.

2. The robotic vehicle of claim 1, wherein the payload deck includes multiple payload connection pads positioned to accommodate selective connection of multiple payload units to the payload deck, each connection pad includes connection points for both payload power and payload communication.

3. The robotic vehicle of claim 1, wherein the controller unit is removable from payload deck.

4. The robotic vehicle of claim 1, wherein the payload deck further comprises a removable battery unit.

5. The robotic vehicle of claim 1, wherein the first pivot is rotatable through an angle of at least 180 degrees.

6. The robotic vehicle of claim 1, wherein the payload deck constitutes between about 30 and 50 percent of a total weight of the vehicle.

7. The robotic vehicle of claim 1, wherein the first end of the linkage is rotatably connected near the front of the chassis, such that the payload deck is displaceable to an aftmost position in which the deck is located within a footprint of the chassis.

8. The robotic vehicle of claim 7, wherein the first pivot of the linkage is located above and forward of the front wheel axis.

9. A method of climbing a step with a robotic vehicle, the method comprising:
    providing a robotic vehicle comprising:
        a chassis having front and rear ends and supported on right and left driven tracks, each track trained about a corresponding front wheel rotatable about a front wheel axis;
        right and left elongated flippers disposed on corresponding sides of the chassis and operable to pivot about the front wheel axis of the chassis, each flipper having a driven track about its perimeter;
        a payload deck configured to support a removable payload;
        a linkage connecting the payload deck to the chassis, the linkage having a first end rotatably connected to the chassis at a first pivot, and a second end rotatably connected to the deck at a second pivot, both of the first and second pivots including independently controllable pivot drivers operable to rotatably position their corresponding pivots to control both fore-aft position and pitch orientation of the payload deck with respect to the chassis, wherein rotation of the linkage about its first and second pivots enables selective positioning of the center of gravity of the payload deck both fore and aft the front wheel axis and the center of gravity of the chassis;

pivoting the first and second flippers upward to engage the edge of the step;

positioning a center of gravity of the payload deck above the front end of the chassis;

pivoting the first and second flippers downward on the edge of the step to engage the top of the step and driving the vehicle forward;

moving the deck with respect to the chassis by rotating both the first and second pivots to position the center of gravity of the payload deck beyond the front end of the chassis;

moving the deck with respect to the chassis by rotating both the first and second pivots to position the center of gravity of the payload deck beyond the edge of the step;

tilting the deck with respect to the chassis by rotating both the first and second pivots to move the center of gravity of the payload deck further beyond the front end of the chassis; and driving the vehicle forward to pull the chassis over the edge of the step.

10. A robotic vehicle comprising:

a chassis supporting a skid steered drive and having a leading end, a trailing end, and a center of gravity therebetween;

a set of driven flippers, each flipper having a pivot end, a distal end, and a center of gravity therebetween, and each flipper being pivotable about a first pivot axis common with a drive axis at the leading end of the chassis;

a linkage having a pivot end, a distal end, and a center of gravity therebetween, and pivotable about a second pivot axis substantially at the leading end of the chassis; and a deck having a leading end and a trailing end, and a center of gravity therebetween, the deck having a mid pivot point located between the leading and trailing ends of the deck, and being pivotable about a third pivot axis substantially at the distal end of the linkage;

wherein the linkage together with the deck shifts more than about 30% of the vehicle weight, shifting a combined center of gravity of the vehicle between an aft center of gravity position intermediate the leading end and trailing end of the chassis and a fore center of gravity position intermediate the distal and pivot ends of the flippers.

11. The robotic vehicle of claim 10, wherein the deck independently tilts within its movement range with respect to the vehicle to shift a combined center of gravity of the vehicle between an aft center of gravity position intermediate the leading end and trailing end of the chassis and a fore center of gravity position intermediate the distal and pivot ends of the flippers.

12. The robotic vehicle of claim 10, wherein the linkage and deck move to an obstacle climbing position in which the linkage extends over an obstacle to be climbed and below an imaginary line between the distal and pivot ends of the flippers, displacing a center of gravity of the vehicle over the obstacle.

13. The robotic vehicle of claim 12, wherein the deck is tilted after the linkage has moved, further displacing a center of gravity of vehicle over the obstacle to be climbed.

14. The robotic vehicle of claim 10, wherein the linkage together with the deck, chassis, and flippers, is movable to standing positions in which the distal end of the flipper approaches the leading end of the chassis to form an acute angle between the flipper and chassis, and the entire linkage is above the common axis of the flipper and chassis.

15. The robotic vehicle of claim 14, wherein the deck tilts independently with respect to the vehicle.

16. The robotic vehicle of claim 14, wherein the acute angle between the flipper and chassis can vary the standing positions without changing the orientation of the deck with respect to the ground.

17. The robotic vehicle of claim 10, wherein the linkage is movable to a position in which the linkage is at least parallel to an imaginary line between the distal and pivot ends of the flippers.

18. The robotic vehicle of claim 10, wherein the linkage extends below an imaginary line between the distal and pivot ends of the flippers.

19. The robotic vehicle of claim 10, wherein the deck is rotatable about the third pivot axis independently of the linkage rotating about the second pivot axis.

20. The robotic vehicle of claim 10, wherein the linkage moves the deck in a circular path about the second pivot axis.

21. The robotic vehicle of claim 10, wherein the deck tilts at an obtuse angle with respect to the linkage.

* * * * *

UNITED STATES PATENT AND TRADEMARK OFFICE
CERTIFICATE OF CORRECTION

| | | |
|---|---|---|
| PATENT NO. | : 7,891,446 B2 | Page 1 of 1 |
| APPLICATION NO. | : 11/762315 | |
| DATED | : February 22, 2011 | |
| INVENTOR(S) | : Adam P. Couture et al. | |

It is certified that error appears in the above-identified patent and that said Letters Patent is hereby corrected as shown below:

Column 1, line 8, delete "Oct. 10, 2006," and insert --Oct. 6, 2006,--

Signed and Sealed this

Twenty-sixth Day of April, 2011

David J. Kappos
*Director of the United States Patent and Trademark Office*